Aug. 27, 1963
L. L. LANDAUER
3,101,760
FOOD SLICING MACHINE
Filed April 22, 1960
4 Sheets-Sheet 3
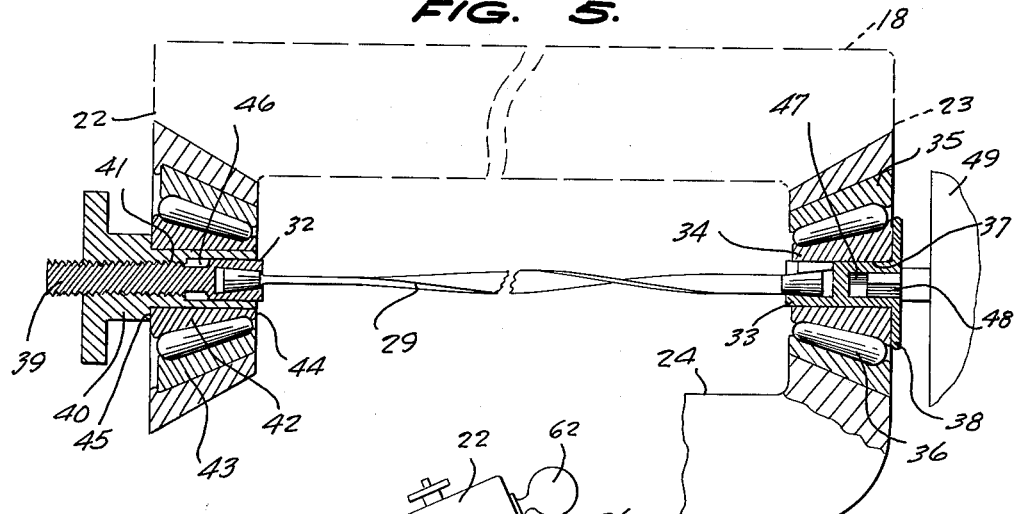
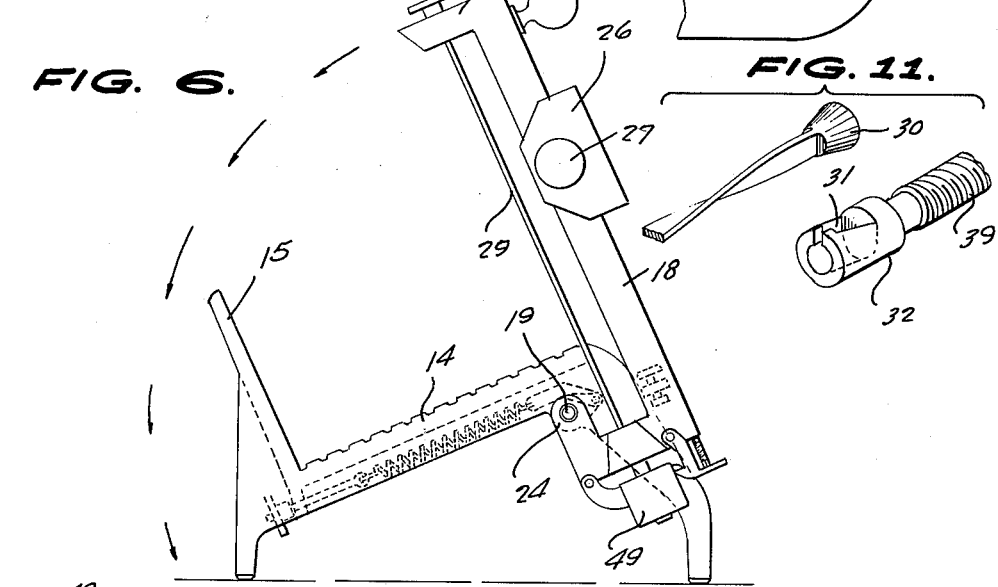
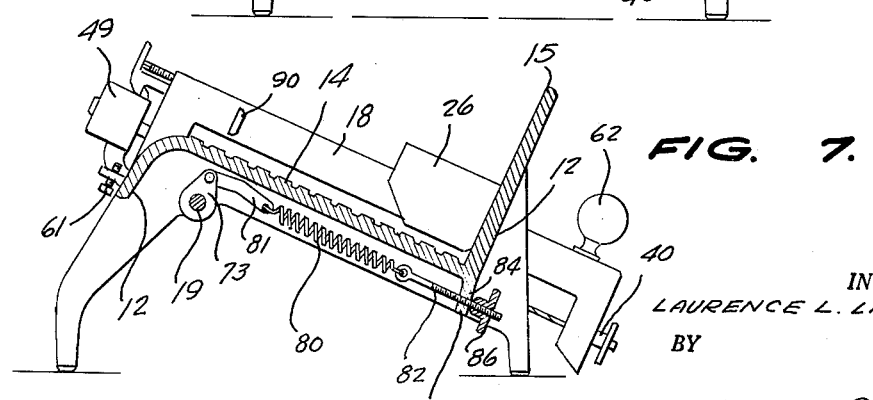
INVENTOR.
LAURENCE L. LANDAUER,
BY
McMorrow, Berman & Davidson
ATTORNEYS.

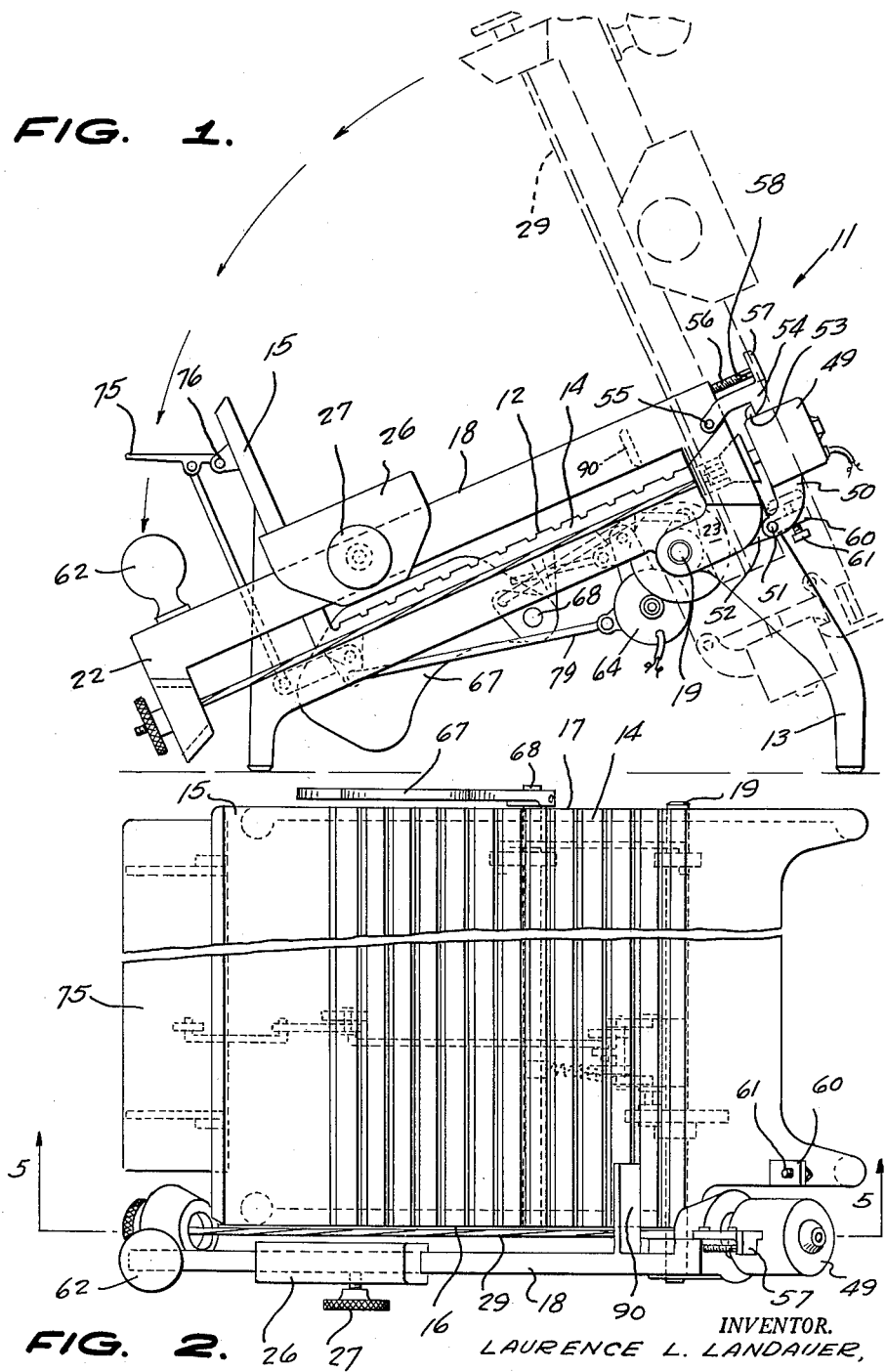

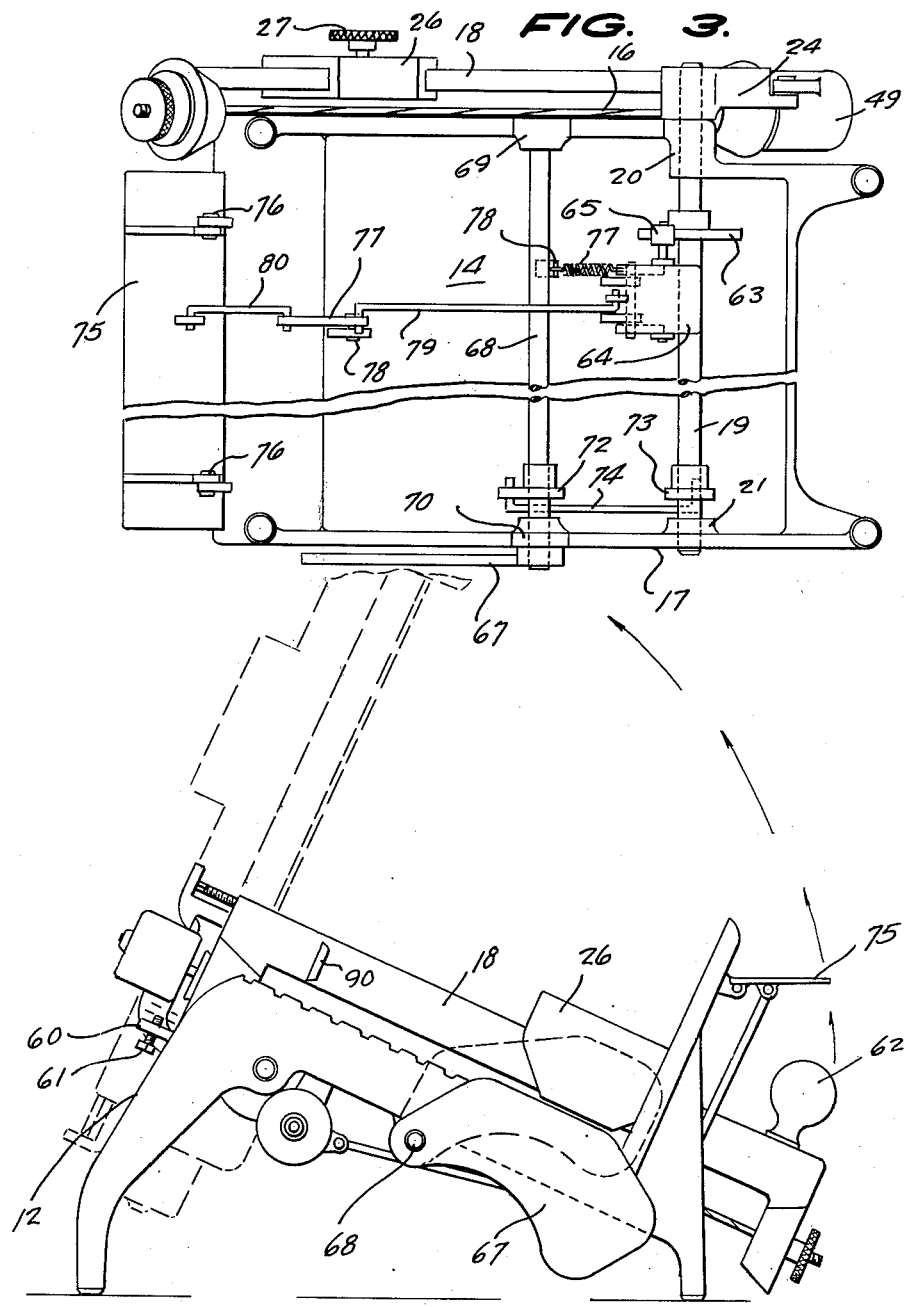

Aug. 27, 1963  L. L. LANDAUER  3,101,760
FOOD SLICING MACHINE

Filed April 22, 1960  4 Sheets-Sheet 4

INVENTOR.
LAURENCE L. LANDAUER,
BY
McMorrow, Berman & Davidson
ATTORNEYS.

United States Patent Office 3,101,760
Patented Aug. 27, 1963

3,101,760
FOOD SLICING MACHINE
Laurence L. Landauer, Hollywood, Fla. (% American Slicers, 6322 N. Cicero Ave., Chicago 46, Ill.)
Filed Apr. 22, 1960, Ser. No. 24,139
3 Claims. (Cl. 146—138)

This invention relates to means for cutting food articles, and more particularly to a food slicing machine for forming slices of various types of food articles, such as meat, cheese, and the like.

A main object of the invention is to provide a novel and improved food slicing machine which is relatively simple in construction, which is easy to operate, and which provides an efficient and clean cutting action.

A further object of the invention is to provide an improved food slicing machine which involves relatively inexpensive components, which does not require sharpening, which is durable in construction, and which enables food to be formed into relatively thin slices without requiring excessive care in the manipulation of the machine.

A still further object of the invention is to provide an improved food slicing machine which is relatively compact in size, which is reliable in operation, which is easy to keep clean, and which is safe to use.

Further objects and advantages of the invention will become apparent from the following description and claims, and from the accompanying drawings, wherein:

FIGURE 1 is a front elevational view of an improved food cutting machine constructed in accordance with the present invention, shown in its normal position.

FIGURE 2 is a fragmentary top plan view of the cutting machine of FIGURE 1.

FIGURE 3 is a bottom view of the machine of FIGURES 1 and 2.

FIGURE 4 is a side elevational view of the machine of FIGURES 1 to 3, taken from the side opposite that shown in FIGURE 1.

FIGURE 5 is an enlarged, fragmentary vertical cross sectional view taken substantially on the line 5—5 of FIGURE 2.

FIGURE 6 is a front elevational view of a modified form of cutting machine constructed in accordance with the present invention.

FIGURE 7 is a transverse vertical cross sectional view taken through the machine of FIGURE 6 but with the cutting arm thereof in its normal lowered position.

FIGURE 11 is an enlarged fragmentary perspective view of the end portions of a rotary rod-like cutting blade element employed in the cutting machine of the present invention.

Figure 8:
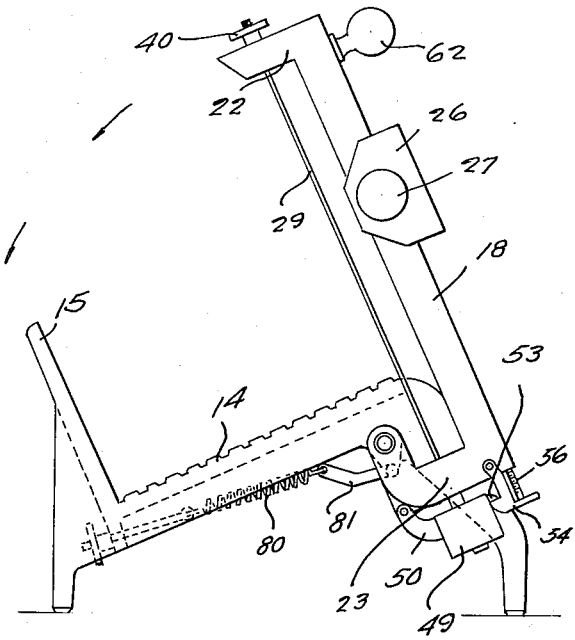
FIGURE 8 is a front elevational view of a further modified form of cutting machine constructed in accordance with the present invention.

Referring to the drawings, and particularly to FIGURES 1 to 5, 11 generally designates a food slicing machine constructed in accordance with the present invention. The machine 11 comprises a trough member 12 adapted to support a food article to be cut into slices, such as a piece of meat, cheese, or the like. The trough member 12 is integrally formed with the supporting legs 13 and comprises a longitudinally grooved, upwardly and laterally inclined main supporting bed 14 which is provided at one side edge thereof with the upwardly extending supporting flange 15 extending perpendicular to the bed 14, as is clearly shown in FIGURE 1.

The supporting bed 14 is provided with the respective front and rear transverse edges 16 and 17. Designated at 18 is an arm which is pivoted to the trough member 12 adjacent its upper side edge, for example, being secured to a shaft 19 journaled in the respective depending flange portions 20 and 21 of the bed member 14 at the respective front and rear transverse edges 16 and 17 of said bed member.

The arm 18 is provided with the depending opposite end portions 22 and 23, the end portion 23 being formed with the extension 24 extending parallel to the main body of the arm and being secured to the end of the shaft 19, whereby to support the arm 18 for rotation in a transverse vertical plane parallel to the adjacent transverse edge 16.

Designated at 26 is a generally sleeve-like weight member which is slidably mounted on the arm 18 and which is provided with a clamping screw 27 which, when tightened, clamps the weight member 26 at an adjusted position on arm 18, whereby it exerts a downward biasing force on said arm.

Designated at 29 is a slender rod-like rotary cutting blade which is journaled in the depending arm end portions 22 and 23 and which extends substantially parallel to the main body of the arm 18, whereby it is movable in the vertical plane of rotation of the arm and may be moved downwardly past the adjacent tranverse edge 16 of the bed member 14 to cooperate shearingly therewith for slicing a food article in a manner presently to be described. The blade 29 may comprise a spirally shaped thin metal blade having conical end portions 30 which are lockingly engageable in conical seats 31 formed in respective socket elements 32 and 33 rotatably mounted in the end portions 22 and 23 of arm 18, as shown in FIGURE 5.

The socket member 33 is slidably engaged in a generally conical inner bearing member 34 which is rotatably supported with respect to a conical outer bearing member 35 secured in the depending arm portion 23 by the roller bearings 36 interposed therebetween, as shown in FIGURE 5. The inner bearing member 34 is formed with a non-circular bore 37, and the socket member 33 is similarly shaped so as to be slidably but nonrotatably engaged in said bore 37, the socket member 33 being formed with an outer flange 38 which limits inward movement of the socket member with respect to the inner bearing member 34. The opposing socket member 32 comprises a threaded outer shaft portion 39 which is threadedly engaged through an annular tightening nut 40, said nut being provided with a reduced inner end portion 41 which is received in the inner conical bearing sleeve 42, as shown in FIGURE 5. The bearing sleeve 42 is rotatably supported in an outer bearing sleeve 43 secured in the depending arm portion 22 by the provision of a plurality of roller bearings 44 interposed between the outer bearing sleeve 43 and the inner bearing sleeve 42, as shown. The tightening nut 40 is formed with the annular inwardly facing shoulder 45 which is engageable with the inner bearing sleeve 42 to exert tension on the blade 29 responsive to the tightening of the nut 40. The main socket portion 32 is slidably received in a bore portion 46 provided in the inner end of the tightening nut 40.

The socket member 33 is formed at its outer end portion with a non-circular, axially extending recess 47 which receives the non-circular coupling end portion 48 of the shaft of an electric motor 49 pivotally mounted on the depending end portion 23 of arm 18. Thus, as shown in FIGURE 1, the motor 49 is provided with a supporting arm 50 which is pivoted at 51 to a lug 52 formed on the depending end portion 23, whereby the motor is swingable so that its non-circular shaft portion 48 is receivable in the correspondingly shaped bore 47 of socket member 33, whereby to couple the motor 49 to the blade 29. The motor is fastened in coupling position by the engagement of a supporting lug 53 on the upper portion of the motor with a fastening hook 54 pivoted at 55 to the upper portion of member 23, the hook 54 being held in locking position by the engagement of a locking screw 56 threadedly engaged in the top end of the portion 23 with a cooperating abutment lug 57 formed on the hook member 54, the screw 56 being provided with a squared top portion 58 so that it may be adjusted by means of a suitable wrench so as to abut lug 57 and hold the hook member 54 in locking engagement with the lug 53 of motor 49. This secures the motor in coupling engagement with socket member 33, whereby the motor is drivingly connected to the blade 29. Whenever it is necessary to replace the blade, the motor may be uncoupled by loosening the screw 56, whereby to allow hook 54 to disengage from lug 53, and whereby to allow the motor 49 to be swung downwardly. Nut 40 may then be loosened sufficiently to allow the flaring conical ends 30 of the blade to be disengaged from the socket members 32 and 33, and to allow a new blade to be inserted.

A stop lug 60 projects laterally outwardly from the side portion of member 12 outwardly adjacent the arm portion 23, and a stop screw 61 is threadedly engaged in the lug 60 and is engageable with a lug 90 on arm 18 to limit the upward rotation of arm 18 to a position such as that shown in dotted view in FIGURE 1.

A handle knob 62 is provided on the arm 18 adjacent its outer depending portion 22, to allow the arm to be moved manually at times, if so desired.

Secured on the intermediate portion of the transversely extending shaft 19 is a friction drive disc 63, clearly shown in FIGURE 3, and pivoted to the bottom of the bed member 14 is an electric motor 64 whose shaft extends adjacent the disc 63 and is provided with a drive roller 65 which is engageable with disc 63 when the motor 64 is rotated in a counterclockwise direction, as viewed in FIGURE 1. The motor 64 is energized from a suitable source of current, and when the roller 65 thereof engages the drive disc 63, the motor transmits torque to the shaft 19, causing the arm 18 to be elevated to the dotted view position thereof shown in FIGURE 1. A relatively heavy biasing arm 67 is secured on a transverse shaft 68 journaled in depending portions 69 and 70 of the front and rear flanges of bed member 14, the shaft 68 having secured thereon a crank disc 72 which is coupled to a crank disc 73 secured on shaft 19 by a link rod 74. The weight arm 67 biases shaft 68 in a clockwise direction, as viewed in FIGURE 4, whereby the crank disc 72 exerts a force to link rod 74 and crank disc 73 which tends to rotate the shaft member 19 in a counterclockwise direction, as viewed in FIGURE 1, and which therefore urges the arm 18 downwardly.

Designated at 75 is an operating plate which is pivoted at 76, 76 to the upper outer portion of the upstanding flange 15. A bell crank lever 77 is pivoted at 78 to the bottom of the bed member 14, one arm of the bell crank lever being connected to the motor 64 by a rod 79 and the other arm of said bell crank lever being connected by a rod 80 to the operating plate 75. When plate 75 is manually depressed, namely, is rotated counterclockwise, as viewed in FIGURE 1, the motor 64 is rotated in a counterclockwise direction, as viewed in FIGURE 1, by the linkage comprising rod 80, bell crank lever 77 and rod 79, to bring the driving pinion roller 65 into frictional engagement with the disc 63, causing the shaft 19 to be rotated in a clockwise direction, as viewed in FIGURE 1, whereby to elevate the arm 18 to its dotted line position, shown in FIGURE 1. When the plate member 75 is released, the motor 64 drops back by gravity, disconnecting its pinion roller 65 from the disc 63, and the weight member 67 causes the arm 18 to move downwardly by gravitational force, whereby the rotating rod-like blade element 29 moves downwardly past the front transverse edge 16 of bed member 14 and slices a food article supported on the bed member and projecting over the edge 16.

Thus, to cut a food article into slices, the food article is placed on the bed member 14 with the portion to be severed located adjacent the edge 16. The plate member 75 is manually depressed, causing the arm 18 to be elevated to the dotted view position thereof shown in FIGURE 1, after which the food article is moved forwardly so that the portion to be severed projects beyond the edge 16. Plate member 75 is then released, whereby the weight member 67 causes the arm 18 to move downwardly and to cause the rotating rod-like blade element 29 to engage the food article and to sever the desired portion thereof as it descends past the shearing edge 16. The downward force and the rate of descent of the arm 18 may be adjusted in accordance with the nature of the material to be cut by adjusting the position of the weight member 26 on the arm 18.

The motors 49 and 64 may be energized through suitable switch means, not shown, from the domestic power lines by means of a conventional line cord.

As shown in FIGURE 3, the motor 64 is biased towards its free position, namely, to the left, as viewed in FIGURE 3, by a coiled spring 77' connected between the frames of the motor and a lug 78' secured to the bottom of bed member 14. This positively disengages the driving pinion 65 from the disc member 63 when the actuating plate member 75 is released.

FIGURES 6 and 7 illustrate a modified form of the invention which is somewhat simplified in that the elevating motor is omitted and the arm 18 is merely biased downwardly by a coiled spring 80 which acts between the main support member 12 and the shaft 19 in a manner to urge said shaft in a clockwise direction, as viewed in FIGURE 7. Thus, an arm 81 is pivotally connected to the crank element 73 in place of the rod 74 in the previously described form of the invention, and the spring 80 has one end thereof connected to the arm 81 and the other end thereof connected to an eye-bolt 82 which extends through an opening 83 formed in a depending flange element 84 provided subjacent the upstanding flange 15. A tensioning nut 86 is threadedly engaged on the outer portion of the eye-bolt 82 to adjust the tension of the spring 80 and to provide the desired amount of downward biasing force acting on arm 18. The downward biasing force may also be adjusted by suitably positioning the weight member 26 in the manner above described.

The form of the invention of FIGURES 6 and 7 operates in a manner similar to that of the form of the invention previously described except that the arm 18 is manually elevated prior to slicing the food article, the food article being placed on the bed member 14 and being moved so that the portion to be severed projects beyond the edge 16 after arm 18 has been manually elevated. Thereafter, the arm 18 is released and is allowed to descend, whereby the rotating rod-like blade element 29 cuts through the food article. If so desired, the downward force may be increased by exerting manual downward force on arm 18 by means of the handle knob 62.

Figure 9:
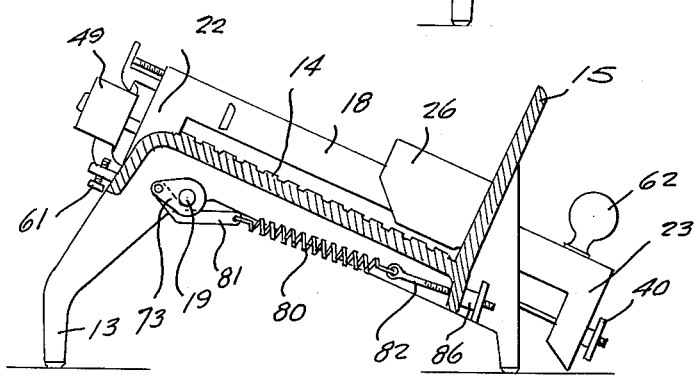
FIGURE 9 is a transverse vertical cross sectional view taken through the cutting machine of FIGURE 8 with the cutting arm thereof shown in its lowered cutting position.

In the form of the invention illustrated in FIGURES 8 and 9, the arm 18 is biased upwardly instead of downwardly, the spring 80 being connected in a manner to normally urge the shaft 19 to rotate in a counterclockwise direction, as viewed in FIGURE 9. Thus, in this form of the invention, the crank member 73 is secured to the shaft member 19 in such a position that the spring 80 exerts a force through the link member 81 which tends to rotate the crank member 73 in a counterclockwise direction. By comparing FIGURES 7 and 9, it will be seen that the crank arm 73 in FIGURE 9 is angularly displaced in a counterclockwise direction, as compared with its position in FIGURE 7, by an angle of approximately 90°, so that the tension of spring 80 acts through the bent arm 81 in a manner to rotate shaft element 19 in a counterclockwise direction. In contrast to this, in FIGURE 7, the bent arm 81 is located over the shaft element 19 in the normal position of arm 18, namely, where the arm is in its lowermost position, so that the spring 80 exerts a downward force on the arm. In FIGURE 9 the spring 80 acts to elevate arm 18.

In using the form of the invention illustrated in FIGURES 8 and 9, the arm 18 is normally elevated by the action of the spring 80. The food article is placed on the bed member 14 and is positioned so that the portion to be severed extends beyond the front shearing edge 16. The arm 18 is then manually rotated downwardly by means of the gripping knob 62 to force the rotating rod-like blade member 29 through the food article and to detach the desired portion thereof.

Figure 10:
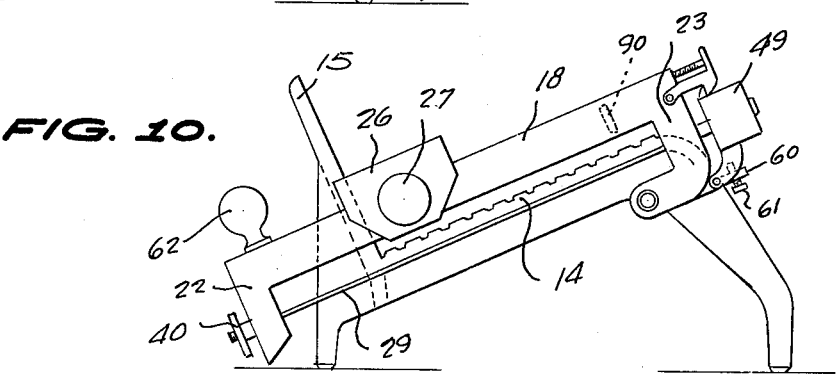
FIGURE 10 is a front elevational view of a still further modified form of cutting machine constructed in accordance with the present invention.

In the form of the invention illustrated in FIGURE 10, the spring 80 is eliminated, and the operation is entirely manual, the weight member 26 being the only element, except for the weight of the arm itself, which acts on the arm to bias it in any manner. In the form of the invention shown in FIGURE 10 the arm 18 must be manually elevated before the food article is positioned for cutting. Thus, the food article is placed on the bed member 14 and the portion to be severed is moved so that it projects forwardly beyond the shearing edge 16. The arm 18 is then pulled downwardly by means of the gripping knob 62 to force the rotating rod-like cutting blade element 29 through the food article and to detach the desired portion thereof. For relatively soft materials, the weight member 26 may be sufficient to provide all the required downward force on the arm 18, but, as above stated, for denser materials, such as meat, or the like, it may be necessary to apply a substantial downward force on the arm 18 by means of the knob 62.

While certain specific embodiments of an improved food slicing machine have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a food cutting machine of the character described, an upwardly and laterally inclined trough member having an upper side edge and a lower side edge and front and rear transverse edges, an upwardly extending supporting flange on the lower side edge of said trough member adapted to slidably support a food article on said trough member for horizontal movement thereon, an arm pivoted to said upper side edge of the trough member adjacent one of said transverse edges for rotation in a vertical plane parallel to said transverse edges, depending support means at the opposite ends of said arm, a slender, rod-like rotary cutting blade journaled in said depending support means for rotation on an axis parallel to the arm, an electric motor mounted on the arm outwardly of its pivotal connection to the trough member and being drivingly connected to the blade, said depending support means being formed and arranged to support said blade for movement in a vertical plane closely adjacent to that of said one transverse edge and for movement downwardly past said one transverse edge responsive to downward rotation of said arm, and a weight member adjustably mounted on said arm and acting to bias said arm downwardly.

2. In a food cutting machine of the character described, an upwardly and laterally inclined trough member having an upper side edge and a lower side edge and front and rear transverse edges, an upwardly extending supporting flange on the lower side edge of said trough member adapted to slidably support a food article on said trough member for horizontal movement thereon, an arm pivoted to said upper side edge of the trough member adjacent one of said transverse edges for rotation in a vertical plane parallel to said transverse edges, depending support means at the opposite ends of said arm, a slender rod-like rotary cutting blade journaled in said depending support means for rotation on an axis parallel to the arm, an electric motor mounted on the arm outwardly of its pivotal connection to the trough member and being drivingly connected to the blade, said depending support means being formed and arranged to support said blade for movement in a vertical plane closely adjacent to that of said one transverse edge and for movement downwardly past said one transverse edge responsive to downward rotation of said arm, a weight member adjustably mounted on said arm and acting to bias said arm downwardly, a second electric motor mounted on said trough member, and means to at times drivingly couple said second motor to said arm.

3. In a food cutting machine of the character described, an upwardly and laterally inclined trough member having an upper side edge and a lower side edge and front and rear transverse edges, an upwardly extending supporting flange on the lower one edge of said trough member adapted to slidably support a food article on said trough member for horizontal movement thereon, an arm pivoted to said upper side edge of the trough member adjacent one of said transverse edges for rotation in a vertical plane parallel to said transverse edges, depending support means at the opposite ends of said arm, a slender rod-like rotary cutting blade journaled in said depending support means for rotation on an axis parallel to the arm, an electric motor mounted on the arm outwardly of its pivotal connection to the trough member and being drivingly connected to the blade, said depending support means being formed and arranged to support said blade for movement in a vertical plane closely adjacent to that of said one transverse edge and for movement downwardly past said one transverse edge responsive to downward rotation of said arm, a weight member adjustably mounted on said arm and acting to bias said arm downwardly, a second electric motor movably mounted on said trough member, cooperating coupling members on said second motor and said arm, a control member pivoted to said upwardly extending supporting flange, and means connecting said control member to said second motor and being constructed and arranged to place said cooperating coupling members in coupling engagement responsive to rotation of said control member.

References Cited in the file of this patent

UNITED STATES PATENTS

| 1,263,385 | Delas | Apr. 23, 1918 |
| 2,137,364 | Streckfuss et al. | Nov. 22, 1938 |
| 2,315,761 | Ahrndt | Apr. 6, 1943 |
| 2,651,344 | Dufour | Sept. 8, 1953 |

FOREIGN PATENTS

| 508,618 | Italy | Jan. 10, 1955 |